United States Patent
Clarke

[11] Patent Number: 6,133,687
[45] Date of Patent: Oct. 17, 2000

[54] CRT HAVING MICROLENSES WITH A PREDETERMINED RELATIONSHIP WITH THE CURVATURE OF THE FACEPLATE

[75] Inventor: John A. Clarke, Carshalton, United Kingdom

[73] Assignee: U.S. Philips Corporation, New York, N.Y.

[21] Appl. No.: 09/304,400

[22] Filed: May 3, 1999

[30] Foreign Application Priority Data

May 8, 1998 [GB] United Kingdom ............ 9809731

[51] Int. Cl.[7] ............................................. H01J 31/00
[52] U.S. Cl. ........................ 313/478; 359/621; 359/622; 313/474
[58] Field of Search ........................... 313/478; 359/621, 359/622, 623, 624, 625, 626, 619

[56] References Cited

U.S. PATENT DOCUMENTS

| | | | |
|---|---|---|---|
| 3,332,318 | 7/1967 | Gessel | 359/619 |
| 3,357,770 | 12/1967 | Clay | 359/626 |
| 3,510,570 | 5/1970 | Melman | 359/626 |
| 5,517,359 | 5/1996 | Gelbart | 359/623 |
| 5,650,876 | 7/1997 | Davies et al. | 359/622 |
| 5,703,717 | 12/1997 | Ezra et al. | 359/623 |
| 5,719,706 | 2/1998 | Masumoto et al. | 359/622 |
| 5,748,374 | 5/1998 | Neijzen et al. | 359/621 |
| 5,796,522 | 8/1998 | Meyers | 359/626 |
| 5,802,092 | 9/1998 | Endriz | 359/622 |
| 5,956,163 | 9/1999 | Clarke et al. | 359/621 |

FOREIGN PATENT DOCUMENTS

| | | | |
|---|---|---|---|
| 0791847A1 | 8/1997 | European Pat. Off. | G02B 27/22 |
| 07077667A | 3/1995 | Japan | G02B 27/18 |
| 2196166A | 4/1988 | United Kingdom | G09F 9/00 |

Primary Examiner—Michael H. Day
Assistant Examiner—Mariceli Santiago
Attorney, Agent, or Firm—Robert J. Kraus

[57] ABSTRACT

An image relay arrangement (20) for use with a curved CRT faceplate (11) to relay a picture to a position in front of the faceplate comprises a first, imaging, microlens array (22), a second, field, microlens array (23) and a third, re-imaging, microlens array (24) which are spaced from one another and have corresponding microlens elements (25, 26, 27). At least one of the first and third arrays is curved with its spacing from the adjacent array varying over its area related to the faceplate curvature. Through this arrangement, the picture at the curved faceplate can be imaged onto a plane where, for example, a lenticular screen is located enabling autostereoscopic displays to be produced.

10 Claims, 2 Drawing Sheets

CRT HAVING MICROLENSES WITH A PREDETERMINED RELATIONSHIP WITH THE CURVATURE OF THE FACEPLATE

BACKGROUND OF THE INVENTION

1. Field of the Invention

The present invention relates to a CRT (cathode ray tube) display system comprising a CRT having a curved faceplate and a layer of phosphor on one side of the faceplate for producing a display picture through the faceplate and optical means arranged on the other side of the faceplate for re-imaging the display picture to a position in front of the CRT.

2. Description of Related Art

CRTs having curved faceplates carrying a phosphor layer energisable by an electron beam to produce a display picture are, of course, well known. However, because in such devices the display picture is formed on the inside of the faceplate it is not directly accessible for manipulation or processing, for example, for contact imaging or spatial filtering purposes. Previously, some CRTs have utilized fiber optic faceplates to allow photographic film to capture the display picture when placed in contact with the fiber optic faceplate but this approach is very expensive and resolution is limited to the size of the optical fibers.

There have been proposals for non-inverting optical image transfer arrangements for use with CRTs and comprising relatively inexpensive microlens arrays but these devices require the CRT's faceplate to be flat and would not operate satisfactorily if used in conjunction with a curved faceplate. One example of such a device is described in the English—language abstract of JP-A-07077667. This device comprises planar microlens arrays arranged with their planes parallel to one another and the plane of the CRT's flat faceplate. If such a device were to be used with a CRT having a curved faceplate then considerable de-focusing of the image would result, possibly together with multiple images of parts of the display image.

BRIEF SUMMARY OF THE INVENTION

It is an object of the present invention to provide a non-inverting image relay device suitable for use with a CRT having a curved faceplate and comprising microlens arrays.

According to one aspect of the present invention a CRT display system having a CRT with a curved faceplate is characterized by an optical image relay arrangement positioned over the faceplate for re-imaging a picture away from the faceplate which comprises in order from the faceplate a first, imaging, microlens array, a second field, microlens array spaced from the first microlens array, and a third, re-imaging, microlens array spaced from the second microlens array, the first, second and third microlens arrays having corresponding microlens elements, and at least one of the first and the third microlens arrays being curved so that its spacing from the adjacent microlens array varies over its area in a predetermined relationship with the curvature of the faceplate.

According to another aspect of the present invention there is provided a non-inverting optical image relay arrangement for use with a CRT having a curved faceplate to re-image a picture away from the faceplate which comprises first, second and third mutually spaced microlens arrays, the first and third microlens arrays comprising respectively imaging and re-imaging lens arrays, and the second microlens array comprising a field lens array disposed between the first and third microlens arrays, the first, second and third microlens arrays having corresponding microlens elements and at least one of the first and third microlens arrays being curved so that its spacing from the adjacent microlens array varies over its area in a predetermined relationship with the curvature of the faceplate.

By using such an optical image relay arrangement it becomes possible to relay the picture produced on the phosphor layer inside the faceplate of the CRT in a non-inverted, substantially 1:1, manner into an accessible position in front of the CRT where photographic film, image sensors, spatial light modulators, colour filters, lenticular screens, for autostereoscopic display purposes, and the like can be placed. The invention stems from an appreciation that the object to image distance in a microlens image relay arrangement can be varied by changing the spacings between the microlens arrays and that this effect can be utilized beneficially for an object lying on a curved surface. If the arrays are arranged such that the spacings vary over the area of the arrays then the object to image distances obtained are varied in corresponding manner. With the spacing variation selected appropriately in relation to the object surface, i.e. the curvature of the phosphor screen, then it becomes possible to determine the position of the image points of the individual microlens elements so that the surface in which the individual image points lie, i.e. the image surface, is substantially flat. This then enables the use of photographic films, 2D image sensors, lenticular screens which can be located conveniently at the image plane.

The curvature of a CRT faceplate is normally in two dimensions, i.e. barrel-like, and it will be appreciated that the microlens array(s) will be curved in a similar manner. Some CRT faceplates can be curved predominantly in one dimension while being only slightly curved in the other dimension so as to present a generally cylindrical form. In this case, the microlens array(s) will again be curved in similar, cylindrical, manner.

Preferably, both the first and third microlens arrays are curved, with the curvature of the first array being in the opposite sense to that of the faceplate, i.e. concave towards the viewer rather than convex towards the viewer like the faceplate, and with the curvature of the third array being in the same sense as the curvature of the faceplate. Although curving just one array may be adequate in some situations, curving of the two arrays in this manner leads to significantly better optical performance in most situations, particularly when imaging onto a flat plane. For most applications re-imaging will be onto a flat plane although the arrangement could be used also to re-image onto curved surfaces which might be useful in some circumstances.

The second, field lens, array may also be curved slightly although in some cases a flat array may suffice.

The actual curvature of the microlens array(s) is selected according to the curvature of the faceplate, i.e. there is a calculated relationship between the curvatures of the array (s) and the faceplate, but these curvatures need not be equal or correspond with that of the faceplate. The relationship would be governed by conventional optical laws and formulae.

The powers of the microlens elements in each respective array may be substantially identical, but different for each array. This is convenient for fabrication purposes as it is relatively simple to make arrays with similar lens elements. However, it is possible that in one or more of the microlens arrays, and particularly the intermediate field lens array, the powers of individual lenses differ over the area of the array. With regard to the field lens array especially, this may be helpful to providing better optical performance and improving light throughput.

BRIEF DESCRIPTION OF THE DRAWINGS

A CRT display system and image relay arrangement in accordance with the invention will now be described, by way of example, with reference to the accompanying drawings, in which.

It will be appreciated that the figures are merely schematic and have not been drawn to scale. The same reference numerals are used throughout the drawings to indicate the same or similar parts.

DETAILED DESCRIPTION OF THE INVENTION

Figure 1:
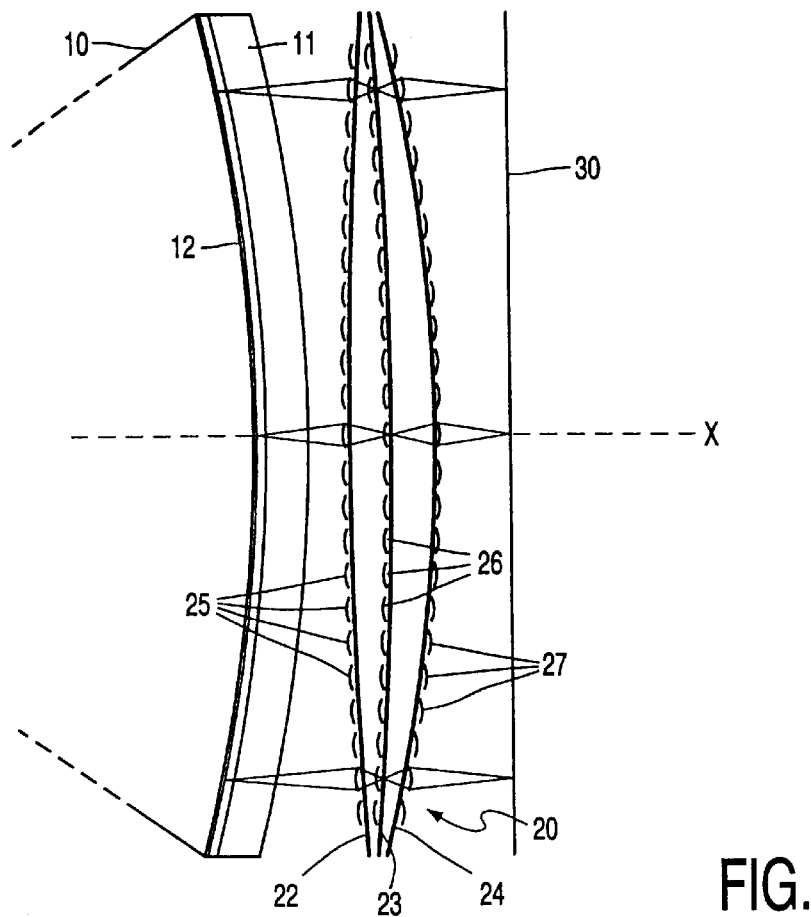
FIG. 1 is a schematic side view of a CRT display system incorporating an optical image relay arrangement in accordance with the invention.

Referring to FIG. 1, the CRT display system comprises a CRT 10, having a glass faceplate 11 and, carried on the inside of the faceplate, a phosphor layer 12 which, in response to excitation by a scanning electron beam, produces a display picture. The CRT faceplate 11 is of conventional form being curved in two dimensions, and bowing outwardly. The central axis of the CRT is indicated by the line X. The phosphor layer, being carried on the inside of the faceplate, follows the same contour.

Positioned over the front of the faceplate there is provided an optical image relay arrangement 20 which, in this embodiment, is operable to relay the image produced on the phosphor layer to a substantially flat image plane 30 in front of the CRT where it is more accessible for subsequent processing. For example, a 2-D image sensor, a photographic or lenticular screen could all be arranged with their receiving face positioned at that plane.

The arrangement 20 consists of three microlens arrays, 22, 23, 24, optically in series, of similar overall size corresponding approximately with the faceplate area and each comprising a 2-D, row and column, regular array of microlens elements, a few of which are indicated at 25, 26 and 27. Only a small number of lens elements in each array are shown in FIG. 1 for simplicity. In practice there may be around 240 rows and 320 columns of lenses in each array for a 240 mm by 320 mm screen size.

Corresponding microlens elements 25, 26 and 27 in the three arrays are substantially aligned with one another in a direction parallel to the CRT's central axis X. The microlens elements 25, 26, 27 in the arrays 22, 23 and 24 serve respectively as imaging lenses, field lenses and re-imaging lenses. In this embodiment the power of the microlens elements in any one array is substantially the same. The powers of the lenses are chosen such that the intermediate images formed on the array 23 are smaller than the corresponding part of the object on the phosphor screen. Example ray paths from 3 different points on the phosphor layer 12 are illustrated in FIG. 1. As can be seen, the spacing of the arrays from the faceplate 11 and the spacings between the corresponding microlens elements in the three arrays are selected so as to provide a certain object to image distance whereby the points on the curved phosphor screen are all imaged at a flat plane 30 substantially orthogonal to the axis X. To achieve this, the corresponding microlens elements in the three arrays are spaced from one another by amounts dependent on their position in relation to the faceplate 11 so that for a required relatively short object to image distance, for example around the central axis X, the spacings are comparatively large, whereas for a relatively long object to image distance, for example towards the periphery of the faceplate, the spacings are comparatively small. For this purpose, the imaging microlens array 22 is curved in the opposite sense to the faceplate 11, such that it bows outwardly in the opposite direction, the re-imaging microlens array 24 is curved in the same sense as the faceplate, such that it bows outwardly in the same direction, and the intermediate field microlens array 23 is slightly bowed in the same sense as the faceplate. The sectional view of FIG. 1 shows the curving of the arrays in one dimension, but it will be appreciated that, like the faceplate, they may be curved in a second dimension as well. Thus, the spacings between the three microlens elements in a corresponding group, one in each array, is determined by the curvature of the arrays and varies over the height and width of the faceplate such that they are largest around the centre and smallest around the edge.

The principle of the operation of the image relay device will be described in more detail with reference to FIG. 2 which shows a part of the relay device and the faceplate, which in this case is in a bottom region of the faceplate. In this enlarged scale, small section, the curvature of the faceplate portion, and similarly the curvatures of the three microlens array portions, become less noticeable and have been approximated as generally flat for the purposes of illustration. Each microlens array comprises a microlens sheet and the microlenses 25, 26 or 27 in each respective sheet are substantially identical, having the same radius of curvature, refractive index, etc., while the lenses in one sheet can differ from those in another. For ease of fabrication, the arrangement may be designed such that the sheets with lenses 25 and 27 are substantially the same. Corresponding and aligned microlenses in each of the three sheets cooperate with one another and function together optically, for example as indicated by the group of three associated microlenses 25' 26' and 27'.

The ray paths for three typical points, a, b, and c, on the phosphor layer 12, constituting an object surface, are shown by way of example from which it is seen that the microlenses relay the image to free-space. The mutual spacings between the microlens sheets change progressively from the top to the bottom so as to vary the total object to image distance obtained from the groups of corresponding microlenses. Towards the bottom of FIG. 2, the object distance becomes greater and this means that the intermediate inverted image at the position of the microlens 26 of the sheet 23 becomes closer to the imaging microlens 25 of the sheet 22. This results in a smaller image. By arranging the re-imagining microlens 27 of the sheet 24 also closer to the microlens 26, greater magnification is obtained so the final image can be the correct size, namely the same as the original object. This also results in a larger final image distance. The increase in object and final image distances is substantially greater than the decrease in intermediate image distances, thus resulting in a greater overall object to image distance.

Figure 2:
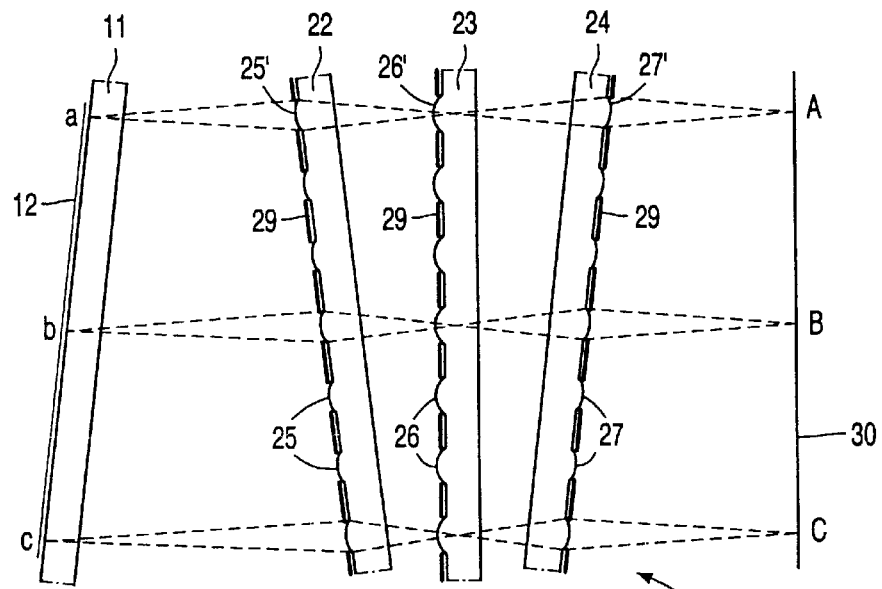
FIG. 2 is a schematic diagram showing parts of the microlens arrays of the image relay arrangement and illustrating the principles of its operation.

Similarly, towards the top of FIG. 2, where the spacing between the sheets becomes greater, the overall object to image distance becomes less.

The purpose of the field microlenses 26 is to image its associated imaging microlens 25 on to its associated re-imaging microlens 27. If all the field microlenses 26 have the same parameters, there will need to be some compromise because of the different spacings. In practice, this effect may be small but, if necessary, the power of the microlenses 26 can differ with a small number of discrete increments in power over the sheet 23. With conventional microlenses comprising a spherical refracting surface such differing in powers can be accomplished by changing the radius of curvature or the refractive index of the microlens elements.

With the particular arrangement depicted in FIG. 2, the points, a, b and c are re-imaged at A, B and C respectively which points lie on a flat plane. By arranging each sheet to have a different curvature, as in the FIG. 1 embodiment, the spacings between the sheets can be accurately controlled, and hence the overall object to image distance can be varied so that the final image is substantially flat, or indeed of any other desired curvature.

As mentioned, the size of the intermediate image depends on the object distance. To avoid possible overlapping of these images it may be necessary to vary the spacing between microlenses in each sheet. All sheets would have a similar spacing geometry.

Instead of a substantially 1:1 geometry a small magnification or reduction in size may be achieved, if desired, by having the microlens spacing in each sheet slightly different. Each respective group of lenses 25, 26 and 27 would still all lie on a straight line but not necessarily parallel to the axis X.

As shown in FIG. 2, the microlenses in each sheet are spaced apart and separated by flats. Preferably, these flats are covered by a black light absorbing material in the form of a black matrix, as indicated at 29 for example, so as to prevent non-imaging light from passing through the arrangement.

Figure 3:
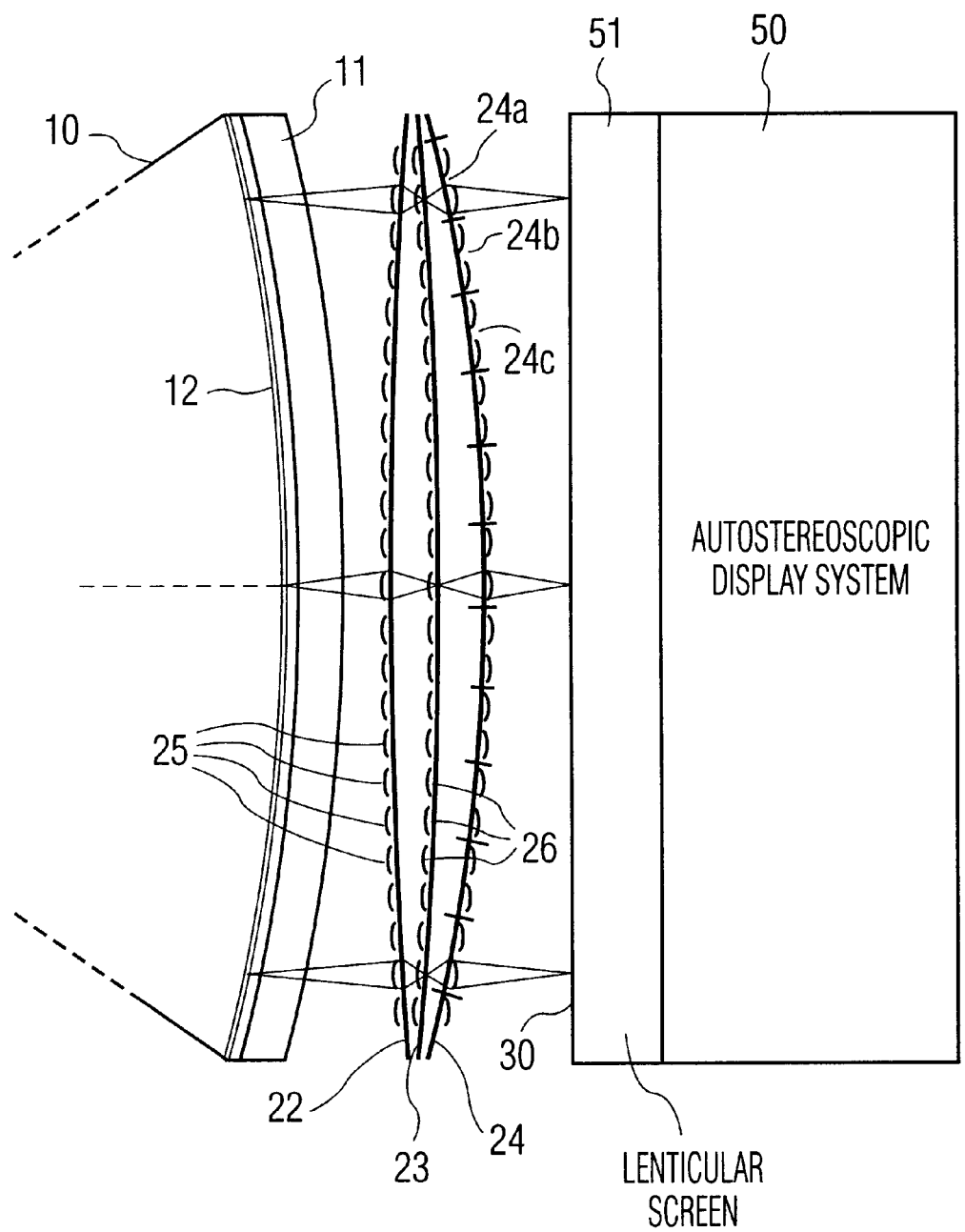
FIG. 3 is a schematic side view of a CRT display system and autostereoscopic display system arrangement in accordance with the invention.

The microlens sheets can be of the type having moulded or graded index microlenses. The sheets may be continuously curved or, as illustrated in FIG. 3, formed as a series of small flat sections, or sub-arrays 24a,b,c, etc., which together follow a required curvature. The microlenses may also be of the diffractive type or surface relief or volume holograms.

By re-imaging the CRT display picture at a substantially flat plane in free space in front of the CRT then the image can be subjected to manipulation or further processing in convenient manner. For example, photographic films, image sensor or filters can readily be positioned at the image plane. As illustrated in FIG. 3, it also becomes possible to position a lenticular screen 51 at the image plane 30 for the purpose of providing autostereoscopic displays.displays 50. Examples of autostereoscopic displays using lenticular screens are described in EP-A-0791847 (PHB 34113) and GB-A-2196166. A good quality autostereoscopic display using a CRT as the display device and a lenticular screen has generally not been possible as the lenticular elements of the screen need to be as close as possible to the display picture plane and the thickness of the CRT's faceplate has prevented this. However, the image relay device overcomes this problem by transferring the display image to free space where the lenticular screen can be positioned. Because of the limited range of angles transmitted by the microlenses, a large field lens, preferably of the Fresnel type, will be required close to the free space image plane.

Various modifications are possible, as will be apparent to persons skilled in the art. For example, with regard to the arrangement of FIG. 1, the microlens arrays may each in effect be reversed such that the lenses lie on the opposite side of the substrate to that shown, and more than three microlens element arrays may be utilized, for example with any of the lens arrays being constituted by two lens arrays arranged adjacent one another in series, the required power being divided between the two arrays. This will reduce the individual lens powers required and/or make manufacturing of the arrangement easier. Also, to aid manufacture two arrays may be on opposite sides of the same substrate.

From reading the present disclosure, various other modifications will be apparent to persons skilled in the art. Such modifications may involve other features which are already known in the field of microlens arrays and re-imaging arrangements in addition to features already described herein.

What is claimed is:

1. A CRT display system having
   a CRT with a curved faceplate and
   an optical image relay arrangement positioned over the faceplate for re-imaging a picture away from the faceplate which comprises in order from the faceplate:
   a first, imaging, microlens array,
   a second field, microlens array spaced from the first microlens array, and
   a third, re-imaging, microlens array spaced from the second microlens array,
   the first, second and third microlens arrays having corresponding microlens elements, and
   at least one of the first and the third microlens arrays being curved so that its spacing from the adjacent microlens array varies over its area in a predetermined relationship with the curvature of the faceplate.
2. A system according to claim 1, wherein
   the first and the third microlens arrays are curved
   with the curvature of the first array being in the opposite sense to that of the faceplate and
   with the curvature of the third array being in the same sense to that of the faceplate.
3. A system according to claim 1, wherein
   powers of the lens elements in at least one of said first, second and third microlens arrays are substantially identical.
4. A system according to claim 1, wherein
   powers of the microlens elements in the second microlens array vary over the area of the array.
5. A system according to claim 1, wherein
   one or more of the first, second and third microlens arrays is formed by two or more sub-arrays arranged in series.
6. A system according to claim 1, wherein
   corresponding microlens elements in the first second and third microlens arrays lie on a straight line.
7. A system according to claim 1, wherein
   the optical image relay arrangement is configured to provide an imaging surface, and
   the system comprises an autostereoscopic display system having
   a lenticular screen positioned at the imaging surface of the optical image relay arrangement.
8. An optical image relay arrangement for use with a CRT having a curved faceplate to re-image a picture away from the faceplate which comprises
   first, second and third mutually spaced microlens arrays,
   the first and third microlens arrays comprising respectively imaging and re-imaging lens arrays,
   the second microlens array comprising a field lens array disposed between the first and third microlens arrays,
   the first, second and third microlens arrays having corresponding microlens elements, and
   at least one of the first and third microlens arrays being curved so that its spacing from the adjacent microlens array varies over its area in a predetermined relationship with the curvature of the faceplate.
9. An arrangement according to claim 8, wherein
   the first and third microlens arrays are curved in opposite senses.
10. An arrangement according to claim 8, wherein
    corresponding microlens elements in the first, second and third microlens arrays are arranged such that they lie on a straight line.

* * * * *